3 Sheets—Sheet 1.
J. M. CLOUGH & W. K. JENNE.
Type-Writing Machine.
No. 199,263. Patented Jan. 15, 1878.
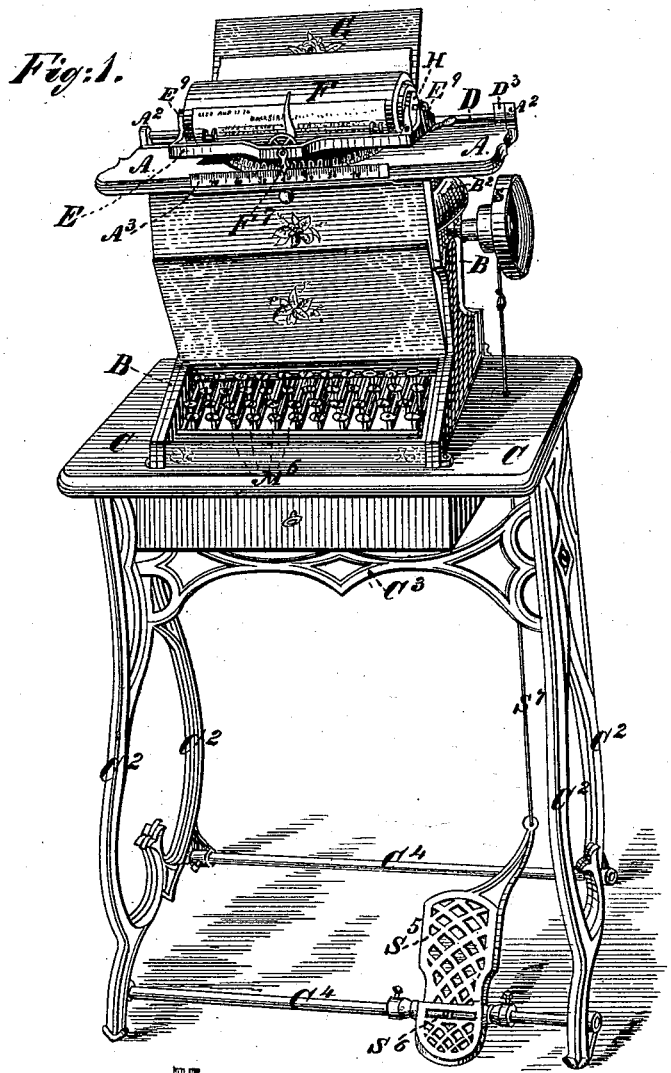
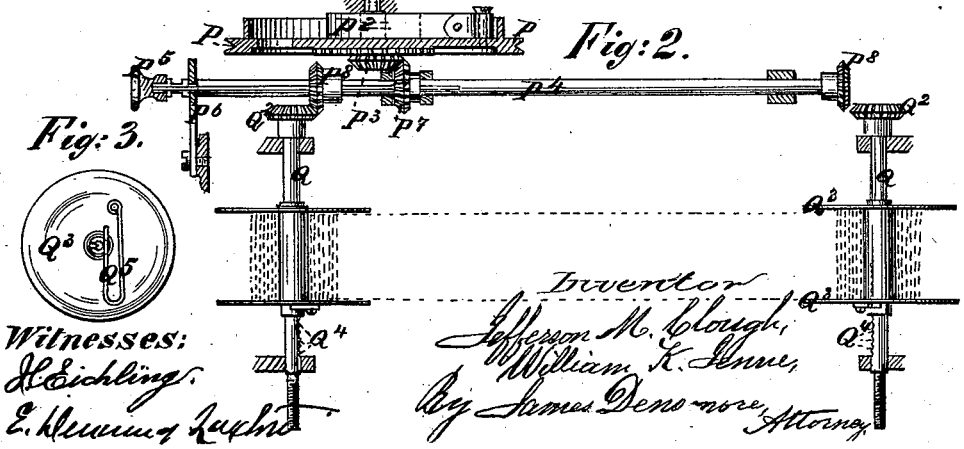

3 Sheets—Sheet 2.
J. M. CLOUGH & W. K. JENNE.
Type-Writing Machine.
No. 199,263. Patented Jan. 15, 1878.
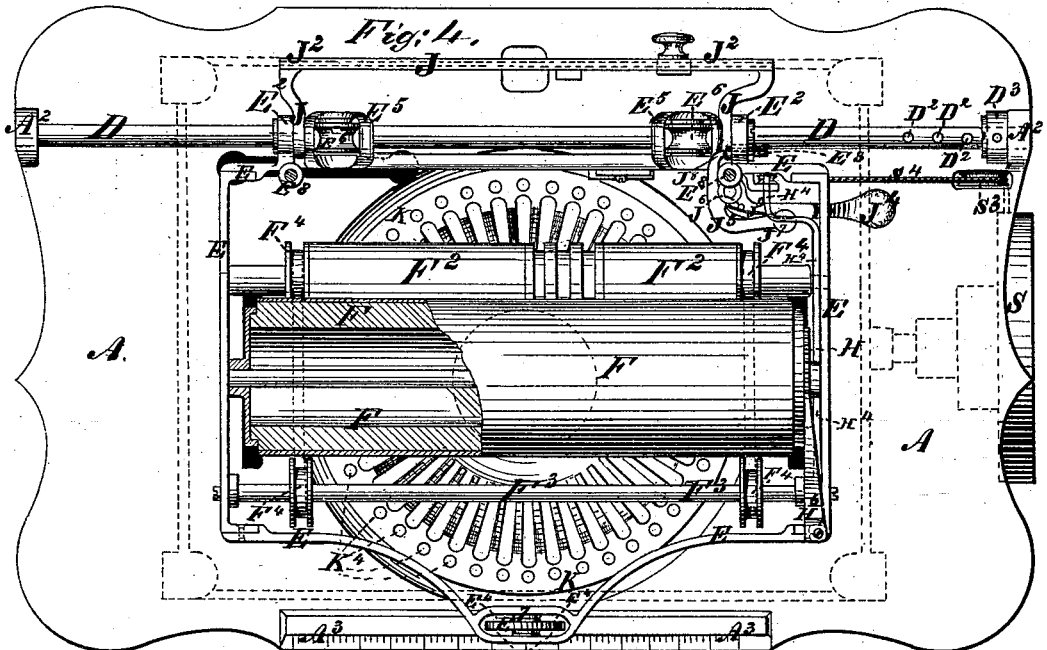
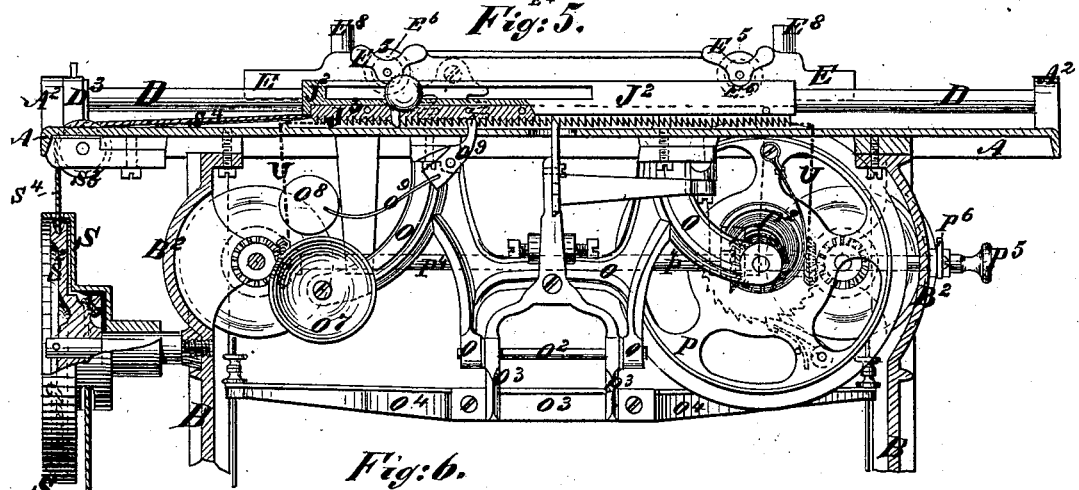
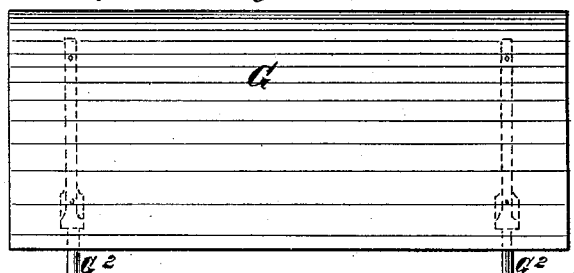
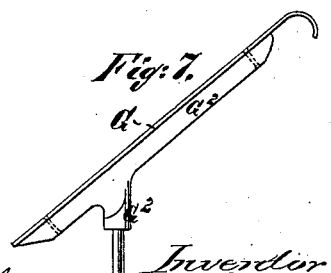
Witnesses:
H. Eichling
E. Dunning Curtis
Inventor
Jefferson M. Clough,
William K. Jenne,
by James Densmore, Attorney 3 Sheets—Sheet 3.
J. M. CLOUGH & W. K. JENNE.
Type-Writing Machine.
No. 199,263. Patented Jan. 15, 1878.
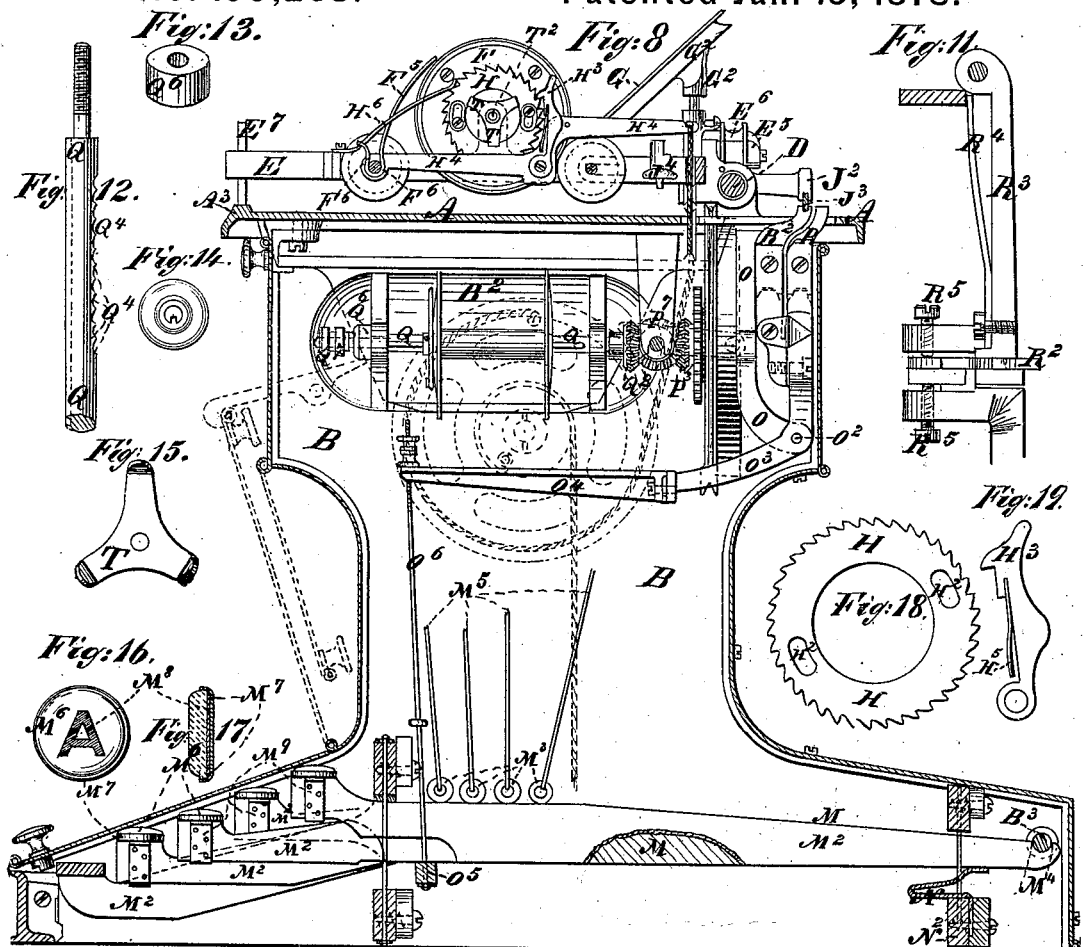

UNITED STATES PATENT OFFICE.

JEFFERSON M. CLOUGH AND WILLIAM K. JENNE, OF ILION, ASSIGNORS TO THE TYPE WRITER COMPANY, OF NEW YORK, N. Y.

IMPROVEMENT IN TYPE-WRITING MACHINES.

Specification forming part of Letters Patent No. 199,263, dated January 15, 1878; application filed November 19, 1875.

*To all whom it may concern:*

Be it known that we, JEFFERSON M. CLOUGH and WILLIAM K. JENNE, of Ilion, in the county of Herkimer and State of New York, have invented Improvements in Type-Writing Machines, of which the following is a specification:

The accompanying drawings and following description fully illustrate the invention.

The figures of the drawings represent views as follows:

Figure 1, a view of a type-writing machine; Fig. 2, a view of the spring-wheel, ribbon-spools, and ribbon-moving gear-wheels of such machine; Fig. 3, a view of a ribbon-spool and holding-spring; Fig. 4, a view of the top plate and paper-carriage; Fig. 5, a view of the spring-wheel, ribbon-moving gear-wheels, bell, and bell-hammer, vibratory frame, letter-space ratchets, ratchet-bar, paper-carriage, and cone-pulley; Figs. 6 and 7, views of the paper-table; Fig. 8, a view of various parts; Figs. 9 and 10, views of the disk-basket; Fig. 11, a view of the letter-space ratchet-spring; Fig. 12, a view of a ribbon-spool axle; Fig. 13, a view of a ribbon-spool friction-pad; Fig. 14, a view of a friction-pad collar; Fig. 15, a view of the line-space regulator; Figs. 16 and 17, views of a type-key and holding-cup; Figs. 18 and 19, views of the line-space ratchet-wheel and ratchet; Figs. 20 and 21, views of the trip-pin and trip-ratchet; Fig. 22, a view of the ribbon-spool hub; Fig. 23, a view of a type-bar; Fig. 24, a view of a type; Fig. 25, a view of a segment of washers; Fig. 26, a view of a type-bar hanger-screw; Fig. 27, a view of a type-bar hub; Fig. 28, a view of a type-bar guide; and Figs. 29 and 30, views of a type-bar hanger.

The description is as follows: A represents the top plate of the main frame of a type-writing machine, which has a large recess in and hole through the middle; $A^2$, a lug on each side of and in line behind the recess in the top plate A; $A^3$, a scale on the front edge of the top plate A; B, a side plate under each end of the top plate A; $B^2$, a pocket from inside outward in each side plate B; $B^3$, a rod across the hind part of the side plates B, near the bottom; C, a stand on which the main frame A B is set; $C^2$, a leg under each end of the stand C; $C^3$, a brace attached to each stand-leg $C^2$, across under the stand-top C; $C^4$, a rod, in front and rear, across the stand-legs $C^2$, near the bottom; D, a rod across over the top plate A attached to the side lugs $A^2$; $D^2$, a series of holes, near one end, through the cross-rod D; $D^3$, a collar loose on the cross-rod D, which has a hole through its diameter like the cross-rod holes $D^2$; E, a paper-carriage frame on the top plate A; $E^2$, a lug on the hind bar of the carriage-frame E, near each end, and loose on the cross-rod D; $E^3$, a pin loose in and through a hole in the carriage-hinge lug $E^2$, next the hinge-rail collar $D^3$, and parallel with the hinge-rail D; $E^4$, a slot vertically through the front bar of the carriage-frame E; $E^5$, a hanger attached to the hind bar of the carriage-frame E, next each hinge-lug $E^2$; $E^6$, a traveling wheel, which has a grooved periphery on the hinge-rail D within each carriage-hanger $E^5$; $E^7$, another traveling wheel in the slot $E^4$ of the front bar of the carriage-frame E on the front edge of the top plate A; $E^8$, a lug, which has a socket on the upper side of the hind bar of the carriage-frame E, next each hinge-lug $E^2$; $E^9$, a lug on the upper side of each side bar of the carriage-frame E, in line across the middle of the recess in the top plate A; F, a cylindrical platen, loose on a long axle attached across to the side lugs $E^9$ of the carriage-frame E; $F^2$, a pressure-roller in slotted bearings on the carriage-frame E, behind, next to, and parallel with the platen F; $F^3$, a rod attached to the side bars of the carriage-frame E, in front of, next to, and parallel with the platen F; $F^4$, a band-pulley loose on each end of the axle-rod $F^3$ of the carriage-frame E; $F^5$, a paper-guide on the middle of the axle-rod $F^3$ of the carriage-frame E; $F^6$, the bottom of the paper-guide $F^5$, bent around the axle-rod $F^3$ of the carriage-frame E; $F^7$, an index on the front bar of the carriage-frame E, over the scale $A^3$ of the top plate A; G, a paper-table behind the platen F on the carriage-frame E; $G^2$, a combined rib and leg on the paper-table G, and in each socket-lug $E^8$ of the carriage-frame E; H, a ratchet-wheel on the end of the platen F; $H^2$, an oblong screw-slot in each of two sides of the ratchet-wheel H; H³, a driving-ratchet, which works in the ratchet-wheel H; H⁴, a lever hinged on the axle-rod F³ of the carriage-frame E, and extended back under the axle of the platen F, between the side-bar lug E⁹ and the ratchet-wheel H, nearly to the hind bar, and to which lever the driving-ratchet H³ is pivoted; H⁵, a spring attached to the driving-ratchet H³, and extended down over a pin in the ratchet-lever H⁴; H⁶, a holding-ratchet attached to the carriage-frame E, so as to work in the ratchet-wheel H; J, a frame loose on the hinge-rail D, between the hinge-lugs E² of the carriage-frame E, and extended rearward; J², the hind bar of the rear frame J, behind and parallel with the hinge-rail D, and which has a longitudinal groove up in the under side, and a longitudinal slot horizontally through the upper part; J³, a ratchet-bar, teeth downward, in the under groove of the rear-frame hind bar J²; J⁴, an arm attached to the fore end of the side bar of the ratchet-bar frame J, next to the hinge-rail collar D³, forward of the hinge-rail D, and bent and extended outward under the side bar of the carriage-frame E, parallel with the platen F; J⁵, a ratchet, in right-angle form, on the front arm J⁴ of the ratchet-bar frame J, and pivoted so it may vibrate in a horizontal plane; J⁶, a vertical pin in the front arm J⁴ of the ratchet-bar frame J, near the pivot of the angle-form ratchet J⁵; J⁷, the front outer end of the angle-form ratchet J⁵, bent up vertically directly under the hind end of the ratchet-lever H⁴; J⁸, the rear inner end of the angle-form ratchet J⁵, extended to and against the loose pin E³ in the hinge-lug E² of the carriage-frame E; J⁹, a spring attached to the angle-form ratchet J⁵, and set against the vertical pin J⁶ of the front arm J⁴ of the ratchet-bar frame J, so as to press the rear inner end J⁸ against the loose pin E³ of the carriage-frame E; K, an annular circular disk, which has a series of pendent slats or rods, inclined inward at the lower ends in basket form; K², a ring, which has a circular rabbet or recess in the upper surface from the inner periphery, attached to the bottom of the pendent rods of the disk K; K³, a cushion in the recess of the bottom ring K² of the disk-basket K; K⁴, a series of screw-holes, equidistant from each other and the center vertically in the upper surface of the disk K; L, a type-bar, which has a socket in the turned-up inner end, and a hub-hole and connecting-wire hole in the outer end; L², the type-bar hub, which has a longitudinal journal-bearing hole through the middle, and a shoulder set against one side, and a cylinder through the hub-hole and upset against the other side of the type-bar L; L³, a hanger, which has a rigid axle through the hub of the type-bar L, and an oblong vertical screw-hole through the outer end on the disk K; L⁴, a long-slotted loop-form guide over a type-bar, L, and under the hanger L³ on the disk K; L⁵, two or more washers, in one piece, in a segment of a circle, over two or more type-bar hangers, L³, on the disk K; L⁶, a screw through the washer L⁵, hanger L³, and guide L⁴, in a screw-hole of the disk K; L⁷, a type in the socket of the type-bar L; M, a series of wooden levers on the pivot-rod B³, and extended horizontally to the front side of the main frame A B; M², a strip of paper on each side of each lever M; M³, a screw-eye in each lever M, between the front end and the pivot B³; M⁴, a half-circle bearing in the hind end of each lever M, and up against the under side of the pivot-rod B³; M⁵, a connecting-wire attached to the screw-eye of each lever M, and to the outer end of a corresponding type-bar, L; M⁶, a glass key, which has a beveled periphery, on the fore end of each lever M; M⁷, a holding-cup on the fore end of each key-lever M, under the key M⁶; M⁸, a letter or character under each key M⁶, in the bottom of the key-cup M⁷; M⁹, a metal loop attached to each key-cup M⁷, and over the fore end of the key-lever M; N, a U-shaped loop-spring under and up against each key-lever M, between the pivot B³ and the screw-eye M³; N², a rest-bar across under the key-lever springs N, parallel with the pivot-rod B³; O, a general hanger attached to the under side of the back part of the top plate A; O², a pivot-rod across in the two lower points of the general hanger O; O³, a rocking frame hinged on the pivot-rod O² of the general hanger O, and which is in right-angle form, with one part extended vertically toward the top plate A, and the other part horizontally toward the front; O⁴, a yoke attached to the horizontal part of the rocking frame O³, which has an arm next each side plate B, extended forward to a line across the front side of the connecting-wires M⁵; O⁵, a pendent bar across under the key-levers M in front of the connecting-wires M⁵; O⁶, a connecting-wire attached to each end of the pendent bar O⁵, and to the end of the corresponding arm of the rocking-yoke O⁴; O⁷, a bell attached to the general hanger O; O⁸, a bell-hammer pivoted to the top plate A, so it may vibrate and strike the bell O⁷; O⁹, the bell-hammer handle, extended up through the top plate A; P, a wheel loose on an axle attached to the general hanger O, in a vertical plane, which has a cord-groove in the periphery and a flange near the periphery, extended outward, parallel with the axle; P², a coiled spring in a scroll within the flange, and attached to both axle and flange of the loose wheel P; P³, a mitered cog-wheel attached to the front side of the spring-wheel P; P⁴, a long axle within the main frame A B, in bearings attached to the top plate A, across between the side plates B, behind the connecting-wires M⁵, and parallel with the hinge-rail D; P⁵, a handle on the end of the long axle P⁴, extended through the side plate B, next the spring-wheel P, and which has two grooves in the periphery, on the outer side of the side plate; P⁶, a latch pivoted to the side plate B, so it may fall into a groove in the axle-handle P⁵; P⁷, a mitered cog-wheel on the long axle P⁴, loose so the axle may reciprocate through it, but attached so as to turn with the axle, and set between the forks of a bifurcated hanger attached to the under side of the top plate A, so it may mesh with the spring-wheel miter-wheel P³; P⁸, a similar mitered cog-wheel on each end of the long axle P⁴; Q, another axle in bearings attached to the top plate A, near each side plate B, and at a right angle to the main gear-axle P⁴; Q², a similar mitered cog-wheel on the hind end of each side gear-axle Q, and set so it may mesh with the main gear-axle cog-wheel P⁸; Q³, a spool, on each side gear-axle Q, and attached so it may turn with and slide along the axle; Q⁴, a series of notches on each spool-axle Q; Q⁵ a loop-spring attached to each spool Q³, and set so as to work in the notches of the spool-axle Q; Q⁶, a friction-pad on the fore end of each spool-axle Q, and against the axle-bearing hanger; Q⁷, a set-screw on each spool-axle Q, and against the friction-pad Q⁶; R, a stiff ratchet attached to the vertical part of the rocking frame O³, and extended up through the top plate A, so as to work in the ratchet-bar J³; R², a limber ratchet pivoted to the stiff ratchet R, so it may vibrate in a plane parallel with the line of the hinge-rail D; R³, a brace pivoted to the under side of the top plate A, and set so as to work against the stiff ratchet R; R⁴, a spring attached to the ratchet-brace R³, and set against a pin attached to the top plate A, so as to press against ratchet and brace; R⁵, a set-screw against each side of the lower end of the limber ratchet R²; S, a shield attached to the outer side of the side plate B, opposite the spring-wheel P; S², a cone-pulley loose on an axle within the shield S, so as to turn in a plane parallel with that of the side plate B; S³, a bearing-pulley, pivoted to the top plate A over the hind part of the cone-pulley S²; S⁴, a cord over the bearing-pulley S³, and attached to the carriage-frame E and to the large sheave of the cone-pulley S²; S⁵, a treadle hinged to the front cross-rod C⁴ at the bottom of the stand C; S⁶, a spring attached to the hinge-rod C⁴ and to the treadle S⁵; S⁷, a connecting-cord attached to the treadle S⁵ and to the small sheave of the cone-pulley S²; T, a trevet or regulator, which has arms of different lengths, loose on the axle of the platen F, directly over the ratchet-lever H⁴; T², a set-screw against the regulator T; and U the inking-ribbon on the spools Q³.

The operation of the devices of the invention is as follows: The cross-rod D over the top plate A and through the lugs E² of the carriage-frame E is both a hinge to turn on and a rail for a guide and to run on, and is a hinge-rail or carriage-rail. The lugs E² form part of the hinge, as well as attach the carriage E to the hinge-rail D, and are hinge-lugs. The grooves in the peripheries of the traveling wheels E⁶ enable the wheels to lap on and grasp the hinge-rail D in a tight clasp. They form part of the hinge, and help keep the carriage in exact line. The hinge-lugs E² are for the same purpose; but the grooved wheels make a closer fit with less friction.

The paper is moved from line to line by turning the platen F, which is turned for that purpose by the ratchet-wheel H, which is thus the "platen ratchet-wheel" or a "line-space ratchet-wheel." The oblong screw-slots H² enable it to be adjusted, from time to time, in relation to the platen, so the whole surface thereof may be exposed to the blows of the types L⁷, instead of having them continuously strike in unvarying lines thereon.

The ratchet-lever H⁴, hinged to the band-pulley axle F³, enables the axle to serve both as a pulley-axle and lever-hinge, and allows the lever to vibrate under the axle of the platen F. It also gives the lever more length, which enables the hind end to vibrate in a larger circle, and more nearly vertically.

The distance of the upward vibration of the ratchet-lever H⁴ determines the distance of the upward vibration of the driving-ratchet H³, which determines the distance the ratchet-wheel H and platen F will turn and the paper move at each downward vibration of lever and ratchet. The upward vibration lifts the driving-ratchet H³ the distance of one, two, or more notch-spaces over the ratchet-wheel H, as the case may be, when it seizes a wheel-tooth and turns the wheel and platen and moves the paper that same distance by the downward vibration. Loosening the set-screw T² will allow the regulator T to turn on the axle of the platen F, as desired. Whichever arm is turned down acts as a stop to the upward vibration of the ratchet-lever, and as the arms are of different lengths the distance of the vibrations of the lever and ratchet can thus be regulated at will, which, as described, regulates the line-space movement of the paper. Thus the turning and setting of the regulator T regulates the line-space movement, and it is a "line-wheel" or "line-regulator," or "line-space regulator."

The depression of the hind end of the treadle S⁵ will pull down and unwind the treadle-cord S⁷ from the small sheave of the cone-pulley S², which will turn the pulley and wind up the carriage-cord S⁴ on the large sheave, and draw the carriage E back to place of beginning. But the carriage end of the cord S⁴ is attached to the hind end of the ratchet-lever H⁴, and the first effect of the strain on the cord is to pull down the lever, which, in going down, strikes the vertical post J⁷ of the angle-form ratchet J⁵ on the front arm J⁴ of the ratchet-bar frame J, which depresses the front arm and raises the hind bar J², and lifts the ratchet-bar J³ off from the letter-space ratchets R R², which enables the carriage E to be moved without obstruction. The spring-wheel P, connected with it by a pulling-cord, is constantly exerting its force to pull the carriage E along, and is only prevented by the teeth of the ratchet-bar $J^3$ striking against the letter-space ratchets R $R^2$, so, when it is drawn back and the strain on the cone-pulley $S^2$ released, the carriage E will again be drawn along a slight distance, more or less, before the ratchet-bar $J^3$ can have time to fall onto the ratchets R $R^2$, unless held in place till the ratchet-bar falls. But, while drawing back, when the carriage approaches the place of beginning the loose pin $E^3$ in the hinge-lug $E^2$ will strike against the hinge-rod collar $D^3$, which will thrust the pin forward against the inner hind end $J^8$ of the angle-form ratchet $J^5$, and thus vibrate the ratchet and throw the outer fore end $J^7$ back and out from under the hind end of the ratchet-lever $H^4$, which will let the ratchet-bar $J^3$ fall before the pull on the carriage E is released, so the instant the pull is released the teeth of the ratchet-bar $J^3$ are found already against the ratchets R $R^2$, and the carriage is held from moving. The ratchet-bar frame J is thus tripped from under the ratchet-lever $H^4$ while the carriage E is drawing back; and the loose pin $E^3$ is a "trip-pin," and the angle-form ratchet $J^5$ is a "trip-ratchet."

The bearing-pulley $S^3$, pivoted in a slot through the top plate A for the carriage-cord $S^4$ to run on, enables the cone-pulley $S^2$ to run in a plane parallel with that of the side plate B, which enables the pulley to set closer to the side plate and under the projecting end of the top plate, and which is a compact and convenient arrangement, and the shield S over the cone-pulley $S^2$ prevents dust and obstruction getting on the pulley, and makes convenient guides for holding the pulling-cords $S^4$ $S^7$ in place on their respective pulley-sheaves.

The longitudinal groove in the under side of the holding-bar $J^2$ of the ratchet-bar frame J is convenient for receiving and holding the ratchet-bar $J^3$, and enables it to be set readily and kept in place in line.

The driving cog-wheel $P^3$ on the spring-wheel P and the transmitting cog-wheels $P^7$ $P^8$ $Q^2$ insure a positive, unslipping, unfailing movement to the ribbon-spools $Q^3$ and inking-ribbon U, which is very desirable.

The loop-spring $Q^5$ on the ribbon-spool $Q^3$, and in a notch, $Q^4$, of the spool-axle Q, enables the inking-ribbon U to be moved along on the spool-axle, and the ribbon shifted in its course over the types $L^7$, as desired, by a slight pressure of the hand, and yet is sufficiently strong to hold spool and ribbon in place.

The friction-pad $Q^6$ on the spool-axle Q, and pressed against the ribbon-spool $Q^3$ by the set-screw $Q^7$, enables a slight adjustable friction to be given to the ribbon-spools $Q^3$, sufficient to keep the inking-ribbon U taut and preventing its sagging, from its own weight, over the middle of the disk K, but not sufficient to prevent the free and easy movement of the spools and ribbon.

The strip of thin tough paper on each side of the wooden key-lever M adds much to the strength and toughness of the lever without appreciably adding to its weight.

It is necessary the lever should be as light as possible, but strong enough not to break in use. Pine is among the lighest of woods, and least liable to spring or warp, but it cracks and splits easily; but a thin strip of Manila paper, $M^2$, glued to each side of the pine or other wooden lever M, effectually prevents all such cracking and splitting, and does not add perceptibly to its weight.

The transparent glass knob $M^6$, with a letter or character, $M^8$, printed on paper under it, makes a cheap and efficient type-key, soft to the eye and smooth to the finger.

The holding-cup $M^7$, with the cup-flange pressed down over the beveled key-knob $M^6$, and with the type-character $M^8$ in the bottom of the cup under the key-knob, makes a simple, light, cheap, and efficient key-holder.

The metal loop $M^9$, attached to the key-holder $M^7$, and wrapped around the fore end of the key-lever M, is a simple, cheap, and efficient fastening, which holds the key firmly without weakening the lever.

The folded, looped, or U-shaped steel spring N under the key-lever M and on the rest $N^2$, between the pivot $B^3$ and the key $M^6$, lifts and holds the lever to place after every depression and release, works promptly and without friction, is simple and cheap, and not liable to weaken by constant and prolonged use.

The type-bar L, thin and wide at the pivot end, of tempered steel, and attached to the long journal-bearing hub $L^2$, by putting the tenon of the hub through a hole through the type-bar, and setting one side of the type-bar against the shoulder of the hub made by the tenon, and swaging the outer end of the tenon against the other side of the type-bar, makes a light, efficient type-bar, which furnishes a bearing the whole length of the hub, and a hub as long as the space will allow, and which will spring to one side without harm when colliding with another, and spring back to place when released from collision.

The long, curved, loop-slotted guide $L^4$, of tempered spring-steel, over the type-bar L, and under the adjustable hanger $L^3$, and adjustable with the hanger, is an elastic, efficient guide, to insure the accurate vibration of the type-bar, and may be set so as to determine the force of the blow of the type $L^7$ against the platen F. The points and thin types need not strike so hard as the fuller, broader types, and by setting the guide $L^4$ down sufficiently, so the type-bar L will strike it a sufficient distance before the type $L^7$ reaches the platen F, the spring of the guide will retard and soften the blow, as desired.

The segment of two or more washers in one piece, $L^5$, over two or more adjustable hangers, $L^3$, is a simple, cheap, and effective device.

It is difficult to prevent a separate hanger, $L^3$, from moving slightly from place while screwing it down to the disk K when only a separate washer is used. The friction of the screw tends to turn the washer, and the friction of the washer, in turn, tends to move the hanger; but by putting a segment of two or more washers in one piece over two or more hangers at one time, the liability of the hanger to move while screwed to place is lessened in proportion to the length of the segment, and when three or more are used in one piece this liability is so slight as to be inappreciable.

The paper-guide $F^5$, extended up in front of the platen F, prevents the paper from falling forward, and throws it over, back, and out of the way, and the bent, curved bottom end $F^6$ over the front band-pulley axle $F^3$, and held in place by friction-spring pressure, makes a convenient fastening for the guide.

These constitute the chief features of the invention, the nature of which may be stated as follows: First, in combining a ratchet-wheel which has adjusting screw-slots with the cylindrical platen of a type-writing machine; second, in combining a wheel which has spokes of different lengths with the ratchet-lever and platen ratchet-wheel of a type-writing machine; third, in combining a trip-pin and trip-ratchet with the ratchet-bar and ratchet-bar raising-lever of a type-writing machine; fourth, in combining a general hanger, which is attached to the main frame, with the spring-wheel, rocking bar, and letter-space ratchets, and bell of a type-writing machine; fifth, in combining a shield with the cone-pulley of a type-writing machine; sixth, in combining a handle or extended end of the main cog-wheel axle of the ribbon movement, which has two latch-grooves in the periphery, with a latch pivoted to the main frame, and with the ribbon-spools of a type-writing machine; seventh, in combining an axle which has a series of stop-notches with a set-spring attached to the ribbon-spools of a type-writing machine; eighth, in combining a curved slotted spring-guide with the adjustable hanger and type-bar of a type-writing machine; ninth, in combining a segment of two or more washers in one piece with two or more type-bars and adjustable hangers of a type-writing machine; and, tenth, in combining the curved end of the paper-guide with the band-pulley axle of a type-writing machine.

The functions of the several devices of the invention are as follows: The function of the grooves in the peripheries of the traveling wheels $E^6$ is to give the hinge of the carriage E a closer clasp or fit on the hinge-rail D without increasing the friction. The function of the adjusting screw-slots in the ratchet-wheel H is to adjust the ratchet-wheel in relation to the platen F. The function of hinging the ratchet-lever $H^4$ on the carriage cross-rod $F^3$ is to make the cross-rod serve both as a hinge for the ratchet-lever and as an axle for the front band-pulleys $F^4$. The function of the regulator T is to regulate the distance of the vibration of the ratchet-lever $H^4$, and thereby the distance of the line-space movement of the platen F and of the paper written on. The function of the trip-pin $E^3$ and trip-ratchet $J^5$ is to trip the ratchet-bar $J^3$ out from under the ratchet-lever $H^4$, so it may drop, and be ready to engage the ratchets R $R^2$ before the carriage E is released from the drawing-back pull. The function of the general hanger O is to hold the spring-wheel P, rocking frame $O^3$, letter-space ratchets R $R^2$, and bell $O^7$ in one piece. The function of the bearing-pulley $S^3$ is to allow the cone-pulley $S^2$ to turn in a plane parallel with that of the side plate B. The function of the shield S is to protect the cone-pulley $S^2$ and guide the connecting-cords $S^4$ $S^7$. The function of the longitudinal groove in the under side of the holding-bar $J^2$ is to hold the ratchet-bar $J^3$. The function of the cog-wheels $P^3$ $P^7$ $P^8$ $Q^2$ is to move the ribbon-spools $Q^3$ and inking-ribbon U with a positive, unvarying motion. The function of the latch $P^6$ and the grooves in the handle $P^5$, or extended end itself of the main gear-axle $P^4$, is to change the direction of the movement of the ribbon-spools $Q^3$ and inking-ribbon U. The function of the looped spring $Q^5$, attached to the ribbon-spool $Q^3$, and of the notches $Q^4$ in the spool-axle Q, is to shift and set and guide the course of the inking-ribbon U. The function of the friction-pad and set-screw $Q^6$ $Q^7$ is to give friction to the ribbon-spools $Q^3$ sufficient to keep the inking-ribbon U taut without obstructing the free movement thereof. The function of the strip of paper $M^2$ is to strengthen and keep the wooden key-lever M from cracking and splitting. The function of the glass knob $M^6$, holding-cup $M^7$, and printed character $M^8$ is to make a type-key. The function of the metal loop $M^9$ is to fasten the key $M^6$ to the key-lever M without weakening the lever. The function of the rest $N^2$ and open, looped, or U-shaped spring N is to lift and hold the key-lever M to place. The function of the thin outer end of the type-bar L is to enable the type-bar to spring to one side in collision, and to spring back to place when the collision is released. The function of the long, protuberant, journal-bearing hub $L^2$, and of the long rigid axle of the adjustable hanger $L^3$, is to give a bearing to the type-bar L. The function of the curved, slotted, spring-guide $L^4$ is to guide the type-bar L and regulate the force of the blow of the type $L^7$. The function of the segment of two or more washers in one piece, $L^5$, is to aid in fastening down the adjustable hanger $L^3$ to place without moving; and the function of the curved end $F^6$ of the paper-guide $F^5$ is to fasten the guide to the pulley-axle $F^3$ by spring-pressure.

The invention consists in improvements on other machines, and in using and showing the devices thereof it is necessary to use and show many of the parts of such other machines; but such parts of other machines form no part of the invention, and are not claimed. Some of the parts thus necessarily used and shown, but not claimed, are as follows: First, the combination of the pivoted type-bars of a type-writing machine, set so they may vibrate and all strike at one place, with the paper-carriage and cylindrical platen, which moves along the line of its axis for a letter-space movement, and turns on its axis for a line-space movement, and which may swing up and off from over the type-bars; second, the combination of a spring-wheel composed of a wheel loose on an axle, and a scroll-form coiled spring attached to such wheel and axle, with the paper-carriage of a type-writing machine; third, the combination of a cone-pulley with the paper-carriage of a type-writing machine; fourth, the combination of a pressure-roller, band-pulleys, and carrying-bands with the cylindrical platen and paper-carriage of a type-writing machine; fifth, the combination of the vibratory frame and letter-space ratchets of a type-writing machine with a ratchet-bar attached to the paper-carriage; sixth, the combination of band-pulleys with the carrying-bands and paper-carriage of a type-writing-machine; seventh, the combination of a paper-guide with the paper-carriage and cylindrical platen of a type-writing machine; eighth, the combination of a line-space regulator with the paper-carriage and cylindrical platen of a type-writing machine; ninth, the combination of a lever with the driving-ratchet, ratchet-wheel, cylindrical platen, and paper-carriage of a type-writing machine; tenth, the combination of an adjustable stop and trip with the bell-hammer, letter-space ratchets, and paper-carriage of a type-writing machine; eleventh, the combination of a driving-wheel and transmitting-wheels with the spring-wheel, ribbon-spools, and inking-ribbon of a type-writing machine; twelfth, the combination of a shifting and regulating guide with the ribbon-spools and inking-ribbon of a type-writing machine.

The combination of a platen with a paper-carriage which has a hinge and guide-rail, whereby the platen is adapted to move horizontally over the types of a type-writing machine, and to move up and off from over the same; the combination of a platen which has axle journals and bearings with a paper-carriage which has a hinge and guide-rail, whereby the platen is adapted both to turn on and move along the line of its axis horizontally over the types of a type-writing machine, and to move up and off from over the same; the combination of a ratchet-bar which has a hinge and guide-rail with the paper-carriage and letter-space ratchets of a type-writing machine; the combination of an adjustable stop with the paper-carriage of a type-writing machine; the combination of an adjustable trip with the paper-carriage and bell of a type-writing machine; the combination of an adjustable trip-stop with the bell and paper-carriage of a type-writing machine; the combination of a vibratory lever with the platen-driving ratchet and ratchet-wheel, paper-carriage, and vibratory ratchet-bar of a type-writing machine; the combination of an adjustable regulator with the line-space mechanism of a type-writing machine; the combination of band-pulleys and carrying-bands with the platen and paper-carriage of a type-writing machine; the combination of a pressure-roller with the platen and carrying-bands of a type-writing machine; the combination of a cone-pulley which has a large and small sheave with a pulling-cord attached to the small sheave and a connecting cord attached to the large sheave and paper-carriage of a type-writing machine; the combination of a foot-lever with the cone-pulley and paper-carriage of a type-writing machine; the combination of a spring-wheel composed of a wheel and coiled spring, attached together, with the connecting-cord and paper-carriage of a type-writing machine; the combination of a driving-wheel and transmitting mechanism with the spring-wheel and inking-ribbon of a type-writing machine; the combination of an adjustable regulator with the ribbon-spools of a type-writing machine; the combination of two ratchets, attached together side by side, pointed practically in the same direction, and pivoted so they may vibrate in the same plane in one direction, but one pivoted separately, so it may vibrate independently in a plane at a right angle to that of the joint vibration, so they may vibrate in parallel planes in the reverse direction, with only one series of ratchet-teeth and notches, and with the key-levers, vibratory frame, paper-carriage, and platen of a type-writing machine; and the combination of a horizontal bar, attached and pivoted so it may vibrate across in front of the key-levers, with the vibratory frame and letter-space ratchets of a type-writing machine, form no part of this invention; but The improvements which do constitute the invention, and which we therefore claim, are as follows:

1. The combination of a ratchet-wheel which has adjusting-slots with the fastening-screws and cylindrical platen of a type-writing machine, substantially as described.

2. The combination of a regulator which has arms of different lengths with the ratchet-lever, driving-ratchet, and platen ratchet-wheel of a type-writing machine, substantially as described.

3. The combination of a trip-pin and trip-ratchet with the ratchet-bar, ratchet-bar raising-lever, and paper-carriage of a type-writing machine, substantially as described.

4. The combination of a general hanger with the spring-wheel, letter-space ratchets, vibratory frame, and bell of a type-writing machine, substantially as described.

5. The combination of a shield with the cone-pulley of a type-writing machine, substantially as described.

6. The combination of a latch with the handle or extended end of the main cog-wheel axle, which has two grooves in its periphery, and with the ribbon-spools of a type-writing machine, substantially as described.

7. The combination of a set-spring with the ribbon-spool of a type-writing machine, and with a spool-axle which has notches in the surface, substantially as described.

8. The combination of a slotted spring-guide with the pivoted type-bar and adjustable type-bar hanger of a type-writing machine, substantially as described.

9. The combination of a segment of two or more washers in one piece with two or more type-bars and type-bar hangers of a type-writing machine, substantially as described.

JEFFERSON M. CLOUGH.
WILLIAM K. JENNE.

Witnesses:
  B. M. HOOPER,
  F. ARMSTRONG.